United States Patent
Pepitone et al.

(10) Patent No.: US 8,090,483 B2
(45) Date of Patent: Jan. 3, 2012

(54) SYSTEM AND METHOD FOR DISPLAYING CONTROL RELATED INFORMATION TO AN AIRCRAFT OPERATOR

(75) Inventors: Dave Pepitone, Sun City West, AZ (US); John Anthony Wise, Glendale, AZ (US); William Rogers, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/705,865

(22) Filed: Feb. 15, 2010

(65) Prior Publication Data

US 2011/0202205 A1    Aug. 18, 2011

(51) Int. Cl.
*G01C 23/00* (2006.01)

(52) U.S. Cl. .......... 701/3; 701/14; 701/29; 701/33; 701/208; 701/211; 340/995.14; 244/158.1

(58) Field of Classification Search .......... 701/3, 4, 701/14–16, 33, 29, 35, 36, 208, 211; 340/995.14, 340/995.15; 244/158.1, 183
See application file for complete search history.

(56) References Cited

U.S. PATENT DOCUMENTS

| | | | | |
|---|---|---|---|---|
| 5,048,285 A | * | 9/1991 | Schmitt et al. | 60/204 |
| 5,892,462 A | * | 4/1999 | Tran | 340/961 |
| 6,347,263 B1 | * | 2/2002 | Johnson et al. | 701/14 |
| 6,751,545 B2 | * | 6/2004 | Walter | 701/120 |
| 2010/0153875 A1 | * | 6/2010 | O'Flynn et al. | 715/786 |

* cited by examiner

*Primary Examiner* — Gertrude Arthur Jeanglaude

(74) *Attorney, Agent, or Firm* — Ingrassia Fisher & Lorenz, P.C.

(57) ABSTRACT

A system for displaying throttle settings to an aircraft operator includes, but is not limited to, a display unit, a data storage unit configured to store aircraft and airport data, an operator input unit configured to receive thrust related information from the aircraft operator, an aircraft sensor configured to detect an aircraft condition, and a processor. The processor is communicatively connected to each of the above components and is configured to obtain therefrom the aircraft data, the airport data, the thrust related information, and the aircraft condition. The processor is also configured to calculate a first thrust requirement based on the aircraft data, the airport data, the thrust related information, and the aircraft condition, and to provide commands to the display unit to display either the first thrust requirement.

20 Claims, 11 Drawing Sheets

SYSTEM AND METHOD FOR DISPLAYING CONTROL RELATED INFORMATION TO AN AIRCRAFT OPERATOR

TECHNICAL FIELD

The present invention generally relates to aircraft and more particularly relates to a system and method for displaying control related information to an aircraft operator.

BACKGROUND

The process of taxiing an aircraft from a gate to the runway prior to take off and from the runway to a gate subsequent to landing frequently involves multiple starts and stops for the aircraft. Unlike an automobile, which provides a nearly immediate response to throttle inputs, an aircraft generally requires more time to accelerate in response to a change in throttle position. Because of this lack of immediate feedback, pilots frequently provide greater throttle inputs (i.e., pushing forward on the throttle to increase the flow of fuel to the aircraft's engines) than is necessary, particularly when starting the aircraft from a dead stop.

Similarly, as the aircraft is taxiing, pilots usually have to guess at what throttle position is necessary to maintain a desired taxi speed. This frequently results in over powering the aircraft's engines, and then under powering them when the aircraft accelerates past the desired taxi speed. This cycle typically repeats until the aircraft is airborne.

Such over powering of the aircraft's engines above what is necessary to achieve either breakaway (the thrust necessary to start an aircraft moving from a dead stop) or a steady taxi speed wastes fuel and introduces excessive emissions into the environment. In addition, over powering the aircraft's engines also adds to noise pollution in the vicinity of aircraft.

Furthermore, in both the case of achieving breakaway thrust and the case of attempting to maintain a steady taxi speed, pilots may rapidly move the throttle from one position to another. This is the equivalent of flooring the gas pedal in an automobile. Such rapid throttle adjustment wastes fuel as compared with a more deliberate throttle movement.

Accordingly, it is desirable to provide a system that reduces the excess fuel consumption, excessive engine wear and tear and emissions that result from an aircraft operator's trial and error approach to throttle control while taxiing. Furthermore, other desirable features and characteristics of the present invention will become apparent from the subsequent detailed description of the invention and the appended claims, taken in conjunction with the accompanying drawings and this background of the invention.

BRIEF SUMMARY

Various non-limiting embodiments of a system and method for displaying throttle settings to an aircraft operator are disclosed herein.

In an embodiment, by way of example only, a system includes a display unit. The system also includes a data storage unit that is configured to store aircraft data and airport data. The system also includes an operator input unit that is configured to receive thrust related information from the aircraft operator. The system also includes an aircraft sensor that is configured to detect an aircraft condition. The system still further includes a processor that is communicatively connected to the display unit, the data storage unit, the operator input unit and the aircraft sensor. The processor is configured to obtain the aircraft data and the airport data from the data storage unit, to obtain the thrust related information from the operator input unit, and to obtain the aircraft condition from the aircraft sensor. The processor is further configured to calculate a first thrust requirement based on the aircraft data, the airport data, the thrust related information, and the aircraft condition. The processor is still further configured to provide commands to the display unit to display the first thrust requirement.

In another embodiment, by way of example only, a system includes a display unit. The system also includes a data storage unit that is configured to store aircraft data and airport data. The system also includes an operator input unit that is configured to receive thrust related information from the aircraft operator including a desired taxi speed. The system also includes an aircraft sensor that is configured to detect an aircraft condition. The system still further includes a processor that is communicatively connected to the display unit, the data storage unit, the operator input unit and the aircraft sensor. The processor is configured to obtain the aircraft data and the airport data from the data storage unit, to obtain the thrust related information from the operator input unit, and to obtain the aircraft condition from the aircraft sensor. The processor is further configured to calculate a first thrust requirement based on the aircraft data, the airport data, the thrust related information, and the aircraft condition. The processor is further configured to provide commands to the display unit to display the first thrust requirement. The processor is further configured to calculate a second thrust requirement based on the aircraft data, the airport data, the thrust related information, and the aircraft condition. The processor is further configured to provide commands to the display unit to display the second thrust requirement.

In another example, by way of example only, a method includes the step of receiving aircraft data, airport data, thrust related information and an aircraft condition. The method further includes the step of calculating a thrust requirement based on the aircraft data, the airport data, the thrust related information and the aircraft condition. The method still further includes the step of displaying the thrust requirement.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved system and method have been provided for use on board an aircraft for displaying control related information, such as thrust requirements, to an aircraft operator. The system includes a variety of components that are configured to either detect or receive inputs that have a bearing on an amount of thrust that is needed to move an aircraft (hereinafter "thrust requirement"). The components provide their respective inputs to a processor. The processor is configured to utilize the respective inputs from each of the components to calculate the thrust requirement needed to start an aircraft rolling from a dead stop, to keep an aircraft rolling at a designated speed, and to increase and/or decrease the designated speed. The system further includes a display unit having a display screen. The display unit is communicatively connected to the processor and is configured to display images on the display screen as commanded by the processor. The processor is configured to provide commands to the display screen to display the thrust requirement.

In some embodiments of the system for displaying control related information to an aircraft operator, one of the components may be a throttle angle sensor that is configured to detect changes in the throttle angle. The throttle angle sensor may also be configured to detect the rate at which the throttle angle changes (hereinafter, the "detected throttle angle change rate") and to provide the throttle angle change rate to the processor. The processor is configured to utilize the respective inputs from each of the components discussed above to calculate an appropriate rate at which the aircraft operator should change the throttle angle to consume the least amount of fuel during the transition from one throttle setting to another (hereinafter, the "appropriate throttle angle change rate"). The processor is configured to compare the detected throttle angle change rate with the appropriate throttle angle change rate and, when a difference is detected, the processor is further configured to provide a warning to the aircraft operator as the aircraft operator repositions the throttle to the displayed throttle setting.

A further understanding of the embodiments of the systems and methods disclosed herein may be obtained through a review of the illustrations accompanying this application together with a review of the detailed description that follows.

Figure 1:
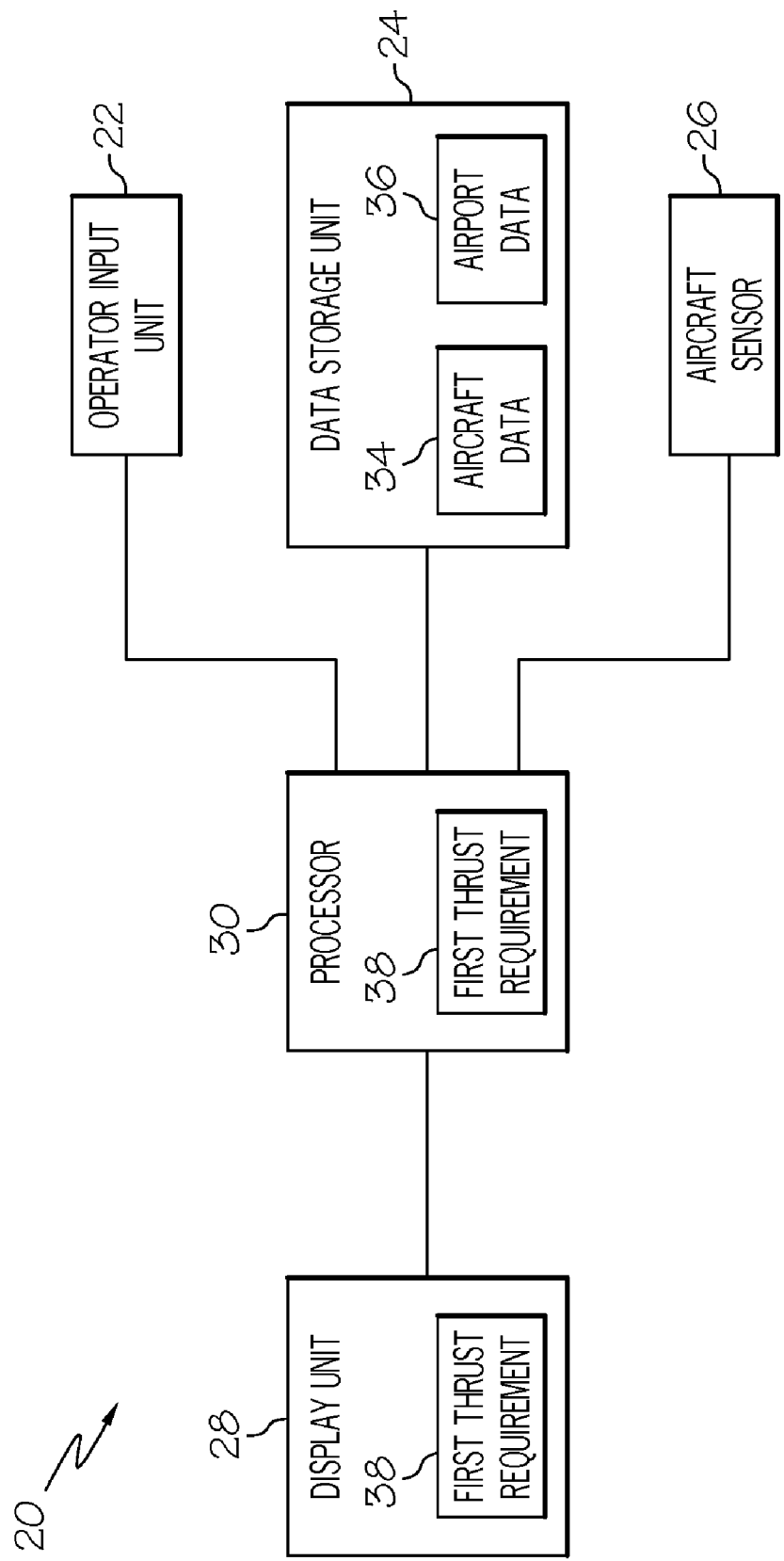
FIG. 1 is a schematic of a system for displaying control related information to an aircraft operator, according to an embodiment.

FIG. 1 is a schematic of a system 20 for displaying control related information to an aircraft operator, according to an embodiment. System 20 may be configured to be mounted or otherwise attached and integrated into any type of fixed wing aircraft including jet aircraft and propeller driven aircraft. System 20 may include an operator input unit 22, a data storage unit 24, an aircraft sensor 26, a display unit 28, an autothrottle 29, and a processor 30.

Operator input unit 22 may be any type of apparatus, machine, system, sub-system or device that is configured to receive human inputs and to convert such inputs into an electronic signal. For example, operator input unit 22 may be an alpha numeric keyboard, a mouse, a trackball, a touch screen, a tablet and stylus, a button, a switch, a knob, a slide, a microphone, a camera, a motion detector, a touch screen, a heat sensor or any other device that is configured to permit a human to provide inputs into an electronic system including a company sent data link. In some embodiments, operator input unit 22 may comprise only a single component. In other embodiments, operator input unit 22 may comprise a plurality of components acting in concert. In some embodiments, operator input unit 22 may be a self contained or independent system, such as a flight management system, that is, itself, configured to receive inputs from the aircraft operator and which, as part of its functioning, provides outputs which are received as inputs by system 20. In some embodiments, operator input unit 22 may be dedicated for use exclusively with system 20 while in other embodiments, operator input unit 22 may be shared with other systems on board the aircraft.

Data storage unit 24 may be any type of electronic memory device that is configured to store data. For example, data storage unit 24 may include, without limitation, non-volatile memory, disk drives, tape drives, and mass storage devices and may include any suitable software, algorithms and/or sub-routines that provide the data storage component with the capability to store, organize, and permit retrieval of data. In some embodiments, data storage unit 24 may comprise only a single component. In other embodiments, data storage unit 24 may comprise a plurality of components acting in concert. In some embodiments, data storage unit 24 may be dedicated for use exclusively with system 20 while in other embodiments, data storage unit 24 may be shared with other systems on board the aircraft.

Aircraft sensor 26 may be any type of sensor including, but not limited to, any type of electronic, mechanical, and/or electromechanical device that is mounted on the aircraft and that is configured to detect a condition or circumstance of the aircraft or a condition or circumstance of the environment in which the aircraft is located. In some embodiments, aircraft sensor 26 may comprise only a single component. In other embodiments, aircraft sensor 26 may comprise a plurality of components acting in concert. In some embodiments, aircraft sensor 26 may be dedicated for use exclusively with system 20 while in other embodiments, aircraft sensor 26 may be shared with other systems on board the aircraft.

Display unit 28 may be any sort or type of display system that is configured to depict graphic images and/or text. In an embodiment, display unit 28 may include a display screen while in other embodiments, display unit 28 may include holographic projectors. Examples of suitable display systems include, but are not limited to, a Cathode Ray Tube (CRT) display device, a flat panel display device, a Liquid Crystal Display (LCD) device, a thin film transistor (TFT) display device, a plasma display device, an electro-luminescent display device, a Light Emitting Diode (LED) display device, a holographic display device such as a Heads Up Display (HUD), a Micro Mirror Device (MMD) display device, electromechanical device or the like. Other suitable displays may include near to eye displays worn by aircraft operators and configured to present images on a screen, lens or projector disposed proximate to the aircraft operator's eye. In some embodiments, display unit 28 may comprise only a single component. In other embodiments, display unit 28 may comprise a plurality of components acting in concert. In some embodiments, display unit 28 may be dedicated for use exclusively with system 20 while in other embodiments, display unit 28 may be shared with other systems on board the aircraft.

Autothrottle 29 may be any type of mechanism that is configured to control the engines of the aircraft so as to increase and/or decrease thrust without direct control by the aircraft operator. Autothrottle 29 may include an independent processor, electromechanical servo motors, and any other mechanism and/or component necessary to allow autothrottle 29 to receive commands from processor 30 and to act on such commands.

Processor 30 may be any type of computer, computer system, microprocessor, controller or other machine that is configured to perform algorithms, to execute software applications, to execute sub-routines and/or to be loaded with and to execute any other type of computer program. In some embodiments, processor 30 may comprise only a single component. In other embodiments, processor 30 may comprise a plurality of components acting in concert. In some embodiments, processor 30 may be dedicated for use exclusively with system 20 while in other embodiments, processor 30 may be shared with other systems on board the aircraft.

Processor 30 is communicatively connected to operator input unit 22, data storage unit 24, aircraft sensor 26, display unit 28, and autothrottle 29, in accordance with an embodiment. Such connection may be effected through the use of any suitable means of transmission including both wired and wireless connections. For example, each component may be physically connected to processor 30 via a coaxial cable or via any other type of wire connection effective to convey signals. In the illustrated embodiment, processor 30 is directly communicatively connected to each of the other components. In other embodiments, each component may be communicatively connected to processor 30 across a vehicle bus. In still other examples, each component may be wirelessly connected to processor 30 via a Bluetooth connection, a WiFi connection, an infrared connection, or the like.

Being communicatively connected provides a pathway for the transmission of commands, instructions, interrogations and other signals between processor 30 and each of the other components. Through this communicative connection, processor 30 may control and/or communicate with each of the other components. Each of the other components discussed above are configured to interface and engage with processor 30 as discussed in detail below.

Figure 2:
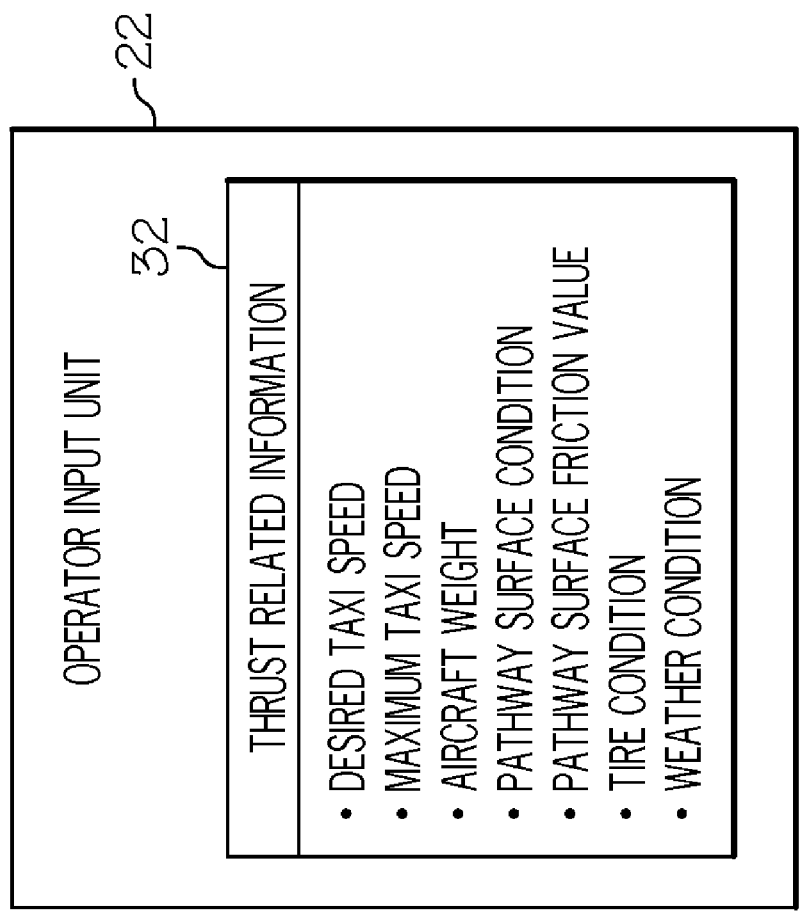
FIG. 2 is a schematic of an operator input unit configured for use with the system of FIG. 1.

FIG. 2 is a schematic of operator input unit 22 configured for use with system 20 of FIG. 1. As discussed above, operator input unit 22 is configured to receive inputs from the aircraft operator and may be used to input information into system 20 that will have an impact on the aircraft's thrust requirement (hereinafter, "thrust related information 32"). Thrust related information 32 may include, but is not limited to, a desired taxi speed and a maximum taxi speed. Thrust related information 32 may also include the gross weight of the aircraft. Thrust related information 32 may also include a pathway surface condition. As used herein, the term "pathway surface" refers to the surface of a pathway (taxiway, apron, and/or runway) that is driven over by the taxiing aircraft and the term "pathway surface condition" refers to a condition of the pathway surface (e.g., wet, dry, iced, etc . . . ). Thrust related information 32 may also include a pathway surface friction coefficient which may be available from data bases, ground controllers, airport publications, or any other suitable source. Thrust related information 32 may also include tire conditions (e.g. state of inflation, tread wear, balance, etc . . . ), weather conditions at the airport (e.g., raining, snowing, humidity, etc . . . ) wind velocity and speed, center of gravity (CG), percent of mean aerodynamic chord (% MAC), current incline of ramp, and ice-snow-water accumulation level in inches.

In an embodiment, operator input unit 22 is configured to automatically provide thrust related information 32 to processor 30 via the communicative connection between these two components. In other embodiments, operator input unit 22 may receive an interrogation from processor 30 seeking thrust related information 32 and may be configured to provide thrust related information 32 only in response to such interrogations.

Figure 3:
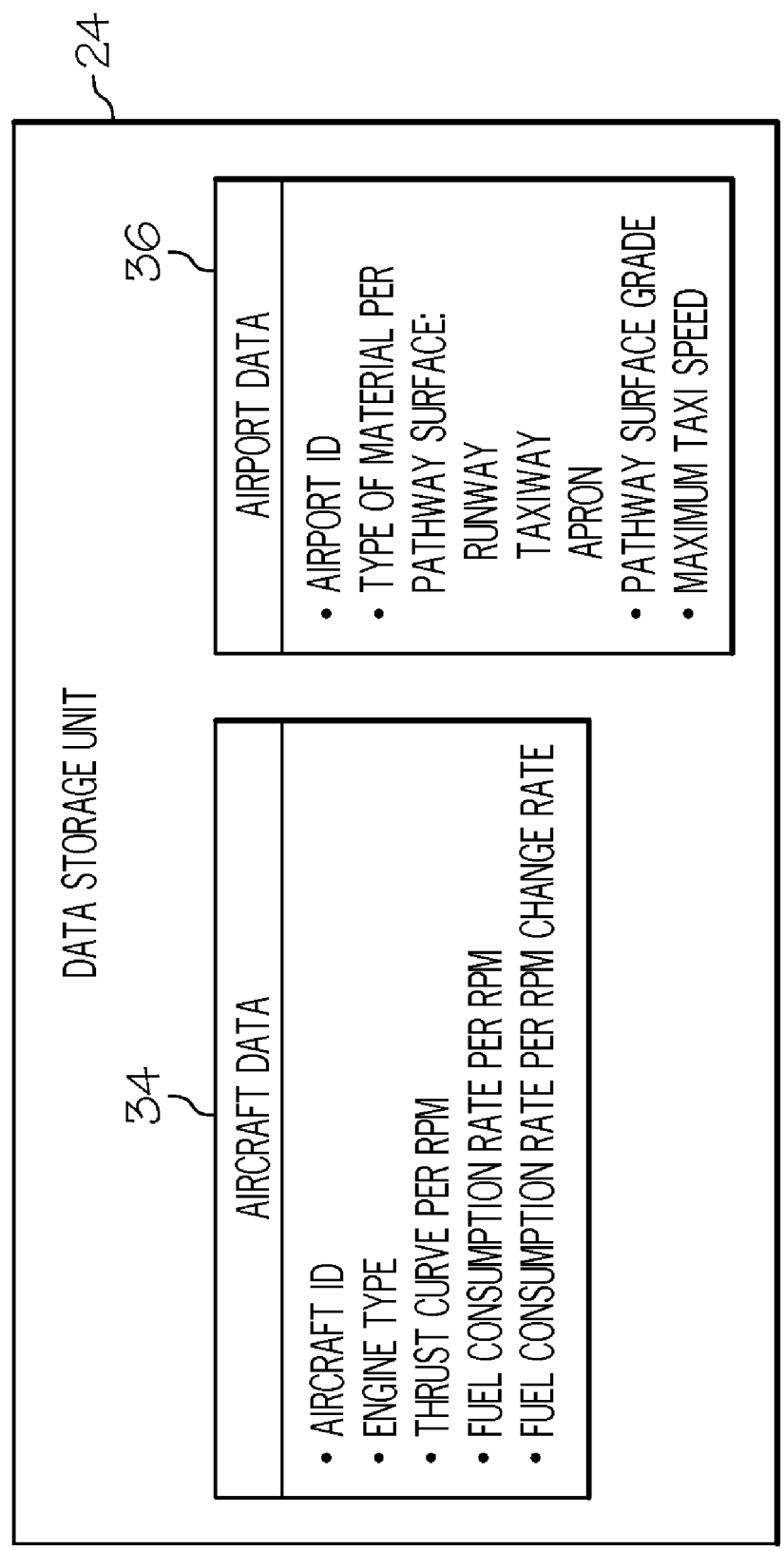
FIG. 3 is a schematic of a data storage unit configured for use with the system of FIG. 1.

FIG. 3 is a schematic of data storage unit 24 configured for use with system 20 of FIG. 1. As discussed above, data storage unit 24 may be any type of electronic memory device that is configured to store data. In an embodiment, data storage unit 24 is configured to store aircraft data 34 and airport data 36. As used herein, the term "aircraft data" refers to information pertaining to an aircraft that is employing system 20. As used herein, the term "airport data" refers to an airport at which an aircraft employing system 20 is located. In some embodiments, data storage unit 24 may store aircraft data 34 for multiple types of aircraft and airport data 36 for multiple airports.

Aircraft data 34 may include an identification of the aircraft employing system 20, such as its make, model, owner and/or operator. Aircraft data 34 may also include information about the type of engine and the number of such engines that the aircraft is equipped with. Aircraft data 34 may also include information pertaining to the thrust curve correlated with revolutions per minute ("rpm") for each engine of the aircraft. Aircraft data 34 may also include a fuel consumption rate correlated with rpms for each engine of the aircraft. Aircraft data 34 may also include a fuel consumption rate for each engine of the aircraft correlated with the rate of change of the engine's rpms, thrust curve per EPR and fuel consumption rate per EPR.

Airport data 36 may include an identification of the airport where the aircraft employing system 20 is located. This information may be provided to data storage unit 24 by another onboard system, such as a GPS navigation system or by an inertial navigation system, or the like which may be communicatively connected to data storage unit 24. Airport data 36 may also include the type of material used to construct each pathway surface at the airport where the aircraft employing system 20 is presently located. Airport data 36 may also include grade (i.e., slope, slant and/or incline) for each pathway surface at the airport where the aircraft is presently located. Airport data 36 may also include a maximum taxi speed for the airport, the maximum gross weight per taxiway or ramp segment (ability of surface to carry weight), thrust sensitive areas, wing tip clearance areas, and airport diagrams (charts of airport showing ramp, taxiway and runway layouts).

Aircraft data 34 and airport data 36 will have an impact on the aircraft's thrust requirement and therefore may be useful to processor 30 when calculating the aircraft's thrust requirement. Accordingly, in an embodiment, data storage unit 24 is configured to automatically provide aircraft data 34 and airport data 36 to processor 30 via the communicative connection between these two components. In other embodiments, data storage unit 24 may receive an interrogation from processor 30 seeking aircraft data 34 and airport data 36 and may be configured to provide such data only in response to such interrogations.

Figure 4:
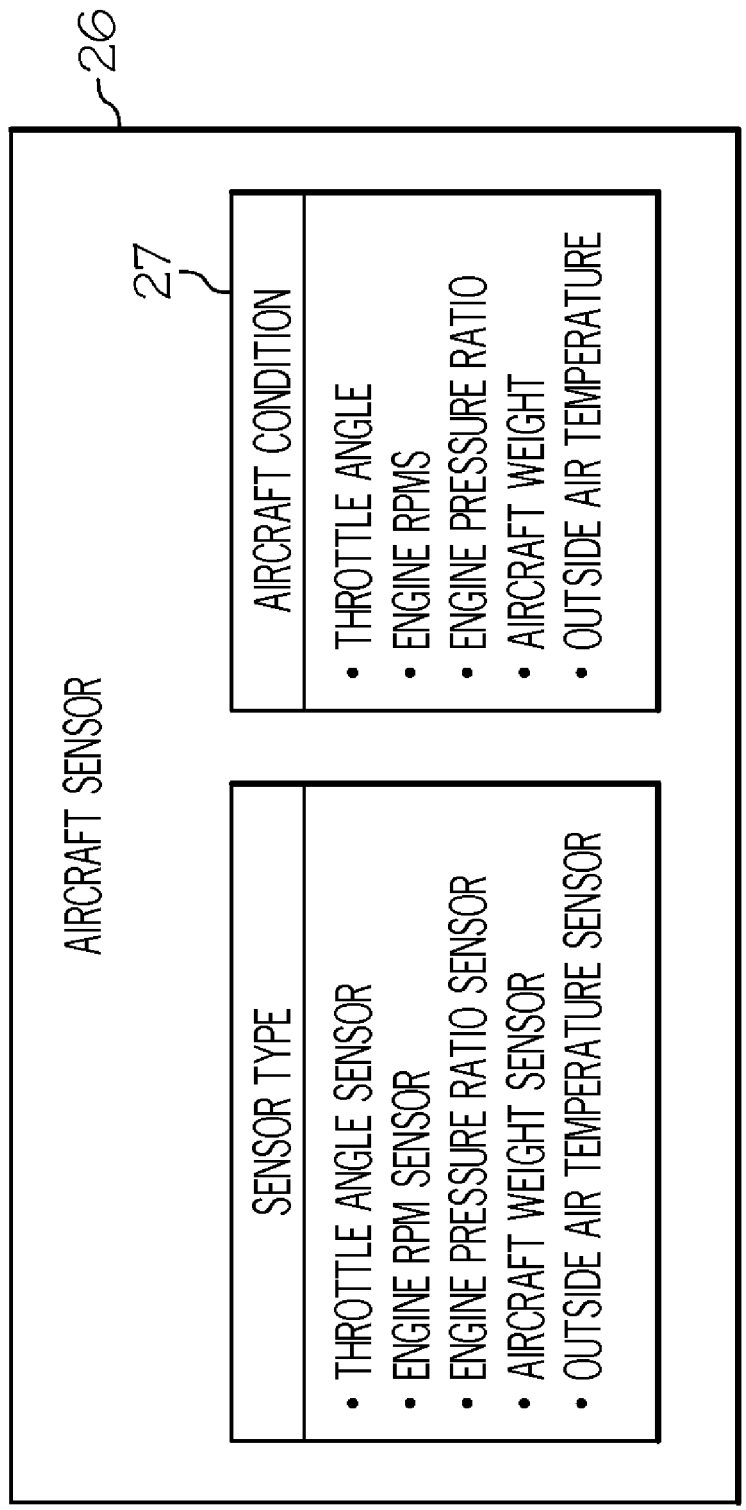
FIG. 4 is a schematic of an aircraft sensor configured for use with the system of FIG. 1.

FIG. 4 is a schematic of aircraft sensor 26 configured for use with the system of FIG. 1. Aircraft sensor 26 may be any one or more of a wide variety of sensors mounted onboard an aircraft. Each sensor type is configured to sense an aircraft condition 27. In an embodiment, aircraft sensor 26 may comprise a throttle angle sensor that is configured to monitor the aircraft's throttle and to detect any change in the throttle angle. A change in the throttle angle would be indicative of an increase or a decrease in fuel flow to the aircraft's engines and a corresponding increase or decrease in the aircraft engine's thrust. In another embodiment, aircraft sensor 26 may comprise an engine rpm sensor configured to monitor the aircraft engine's rpms and to detect changes therein. In another embodiment, aircraft sensor 26 may comprise an engine pressure ratio sensor configured to monitor the aircraft engine's pressure ratio and to detect changes therein. In another embodiment, aircraft sensor 26 may comprise an aircraft weight sensor that is configured to detect/determine the weight of the aircraft employing system 20, and to detect changes therein such as may occur during flight (i.e., consumption of fuel) or on the ground (offloading of cargo and/or passengers). In another embodiment, aircraft sensor 26 may comprise an outside air temperature sensor that is configured to detect the air temperature in the vicinity of the aircraft. In another embodiment, aircraft sensor 26 may comprise a position determining unit that is configured to determine the position of the aircraft with respect to the surface of the earth. In still another embodiment, aircraft sensor 26 may comprise an inclinometer that is configured to determine the current incline of a ramp or other surface the aircraft is located on.

Aircraft sensor(s) 26 will detect conditions, settings, and circumstances that will have an impact on the aircraft's thrust requirement and which therefore may be useful to processor 30 when calculating the aircraft's thrust requirement. Accordingly, in an embodiment, aircraft sensor(s) 26 is configured to automatically provide the information it has sensed/detected to processor 30 via the communicative connection between these two components. In other embodiments, aircraft sensor(s) 26 may receive an interrogation from processor 30 seeking the sensed/detected information and may be configured to provide such data only in response to such interrogations.

With reference once again to FIG. 1, in an embodiment, system 20 works as follows. An aircraft operator enters thrust related information 32 into operator input unit 22. In some embodiments, operator input unit 22 automatically provides thrust related information 32 to processor 30 and this initiates operation of system 20. In other embodiments, the aircraft operator may need to actuate a switch or take some other action after entering thrust related information 32 in order to initiate operation of system 20. Processor 30 may then obtain aircraft data 34 and airport data 36 from data storage unit 24 and aircraft condition 27 from aircraft sensor 26. In other embodiments, processor 30 may have already obtained aircraft data 34, airport data 36 and aircraft condition 27 prior to the aircraft operator entering thrust related information 32 into operator input unit 22.

Processor 30 is configured to utilize thrust related information 32, aircraft data 34, airport data 36, and aircraft condition 27 to calculate a first thrust requirement 38. Processor 30 may perform the calculation by executing or otherwise utilizing any of a variety of software applications that have been written to permit the calculation of a thrust requirement based on thrust related information 32, aircraft data 34, airport data 36, and aircraft condition 27, as well as other factors. When system 20 is actuated while the aircraft is stationary, the first thrust requirement corresponds to a breakaway thrust for the aircraft. In some embodiments, the breakaway thrust may be calculated to include some amount of overpowering of the aircraft's engines in order to overcome factors which may not have been taken into consideration or to accommodate a margin of error in the factors that have been entered/detected. In another embodiment, the breakaway thrust may correspond substantially to the least amount of thrust required to start the aircraft rolling from a dead stop without any overpowering of the aircraft's engines.

In an embodiment, if the aircraft is already taxiing when system 20 is actuated, first thrust requirement 38 will correspond to an increase or decrease in thrust to provide the acceleration or deceleration needed to achieve a user defined taxi speed. Once processor 30 has calculated first thrust requirement 38, processor 30 is configured to provide commands to display unit 28 to display first thrust requirement 38.

Figure 5B:
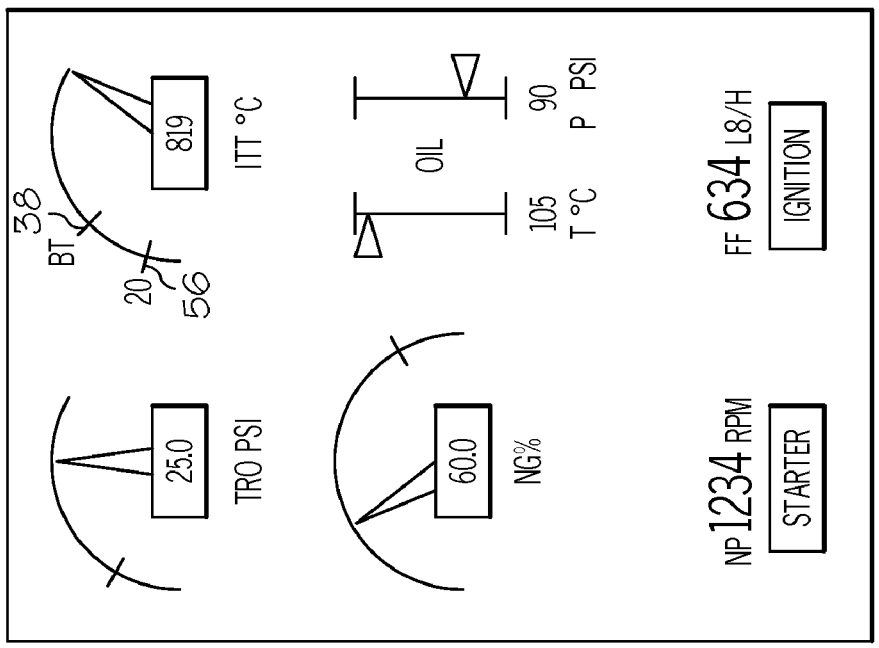
FIG. 5B is a schematic illustration of a display screen displaying a thrust requirement generated by the system of FIG. 1 in an alternate manner.
Figure 5A:
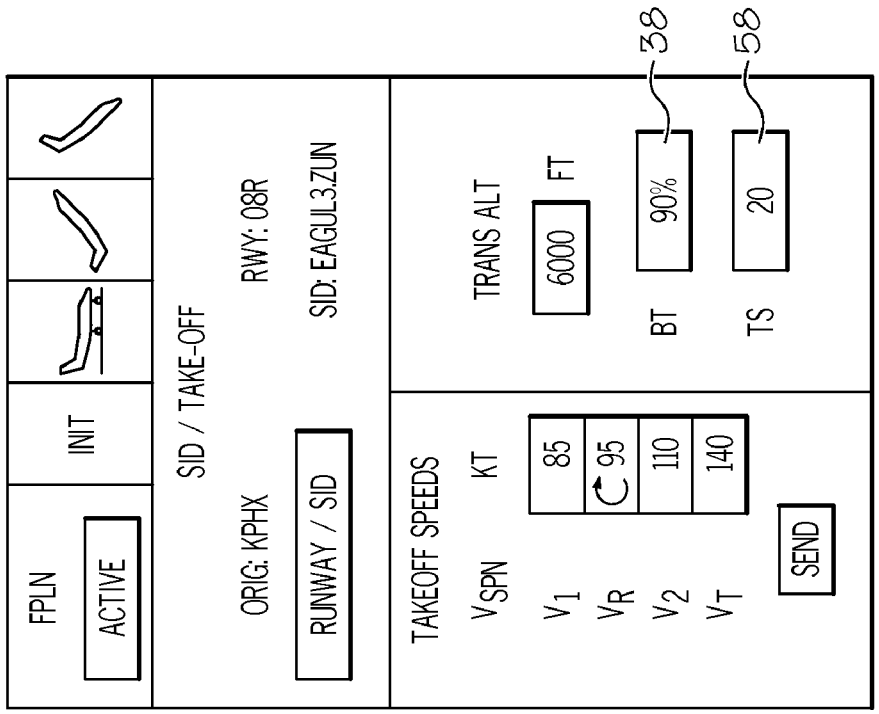
FIG. 5A is a schematic illustration of a display screen displaying a thrust requirement generated by the system of FIG. 1.

FIG. 5A is a schematic illustration of a display screen displaying first thrust requirement 38 generated by system 20 of FIG. 1. The display screen of FIG. 5A comprises a portion of a conventional Flight Management System (FMS) with windows and annotations added to permit the display of first thrust requirement 38. In the embodiment illustrated in FIG. 5A, first thrust requirement 38 is displayed as a percentage of total available thrust. The letters "BT" indicate breakaway thrust. In this example, when the aircraft's engines are operated such that they produce ninety percent of their available thrust, then the aircraft should breakaway from a dead stop.

FIG. 5B is a schematic illustration of a display screen displaying first thrust requirement 38 generated by system 20 of FIG. 1 in an alternate manner. The display screen of FIG. 5B comprises a portion of an aircraft's primary flight display that is used to display engine parameters. One of the engine parameters displayed is Interturbine Temperature (ITT), which is depicted on an analog dial. ITT can be either a thrust limiting parameter or a thrust setting parameter. ITT measures temperature as a correlate of thrust or power production. In the illustrated embodiment, first thrust requirement 38 is displayed as a tic mark disposed along the curve of the analog dial in a position corresponding to the ITT required to generate first thrust requirement 38. The letters "BT" are positioned adjacent to the tic mark and indicate that the tic mark corresponds with the breakaway thrust requirement. When the arrow reaches this tic mark, then the aircraft's engines are generating enough thrust to achieve breakaway. In an embodiment, these tic marks may blink, flash, strobe, pulse, change color, increase in intensity, increase in size or otherwise change in appearance to attract the attention of the aircraft operator if the power setting associated with the tic mark is exceeded.

In other embodiments, the primary flight display (or some other cockpit mounted display unit) may include a trend vector that shows where the power setting will be for an associated throttle angle. Trend vectors are currently used in aircraft to show what an aircraft's airspeed will be at a predetermined number of seconds (e.g., six seconds) after a change in throttle angle. A similar indication could be provided on any or all of the engine parameters displayed on the gages illustrated in FIG. 5B. This could assist the aircraft operator in determining where to position the aircraft's throttle when attempting to match the thrust requirement indicated by system 20.

In other embodiments, first thrust requirement 38 may be displayed in any other suitable manner. Other suitable manners may include, but are not limited to, the use of graphics and/or alphanumerics to communicate to the aircraft operator the required engine rpms, compression ratios, pounds of thrust, and/or any other suitable engine parameter that correlates to the thrust output of an aircraft engine.

When the aircraft operator is informed of first thrust requirement 38 by system 20, the aircraft operator may then adjust the throttle to achieve first thrust requirement 38. To do so, the aircraft operator may watch the gage that displays the engine parameter that corresponds to first thrust requirement 38. Using the example illustrated in FIG. 5A, the aircraft operator would observe the gage measuring thrust as a percentage of available engine thrust. When the gage reaches ninety percent, then the aircraft operator will stop adjusting the throttle and the aircraft should break away from a stop. Using the example illustrated in FIG. 5B, the aircraft operator would observe the gage measuring ITT. When the arrow reaches the tic mark annotated with the "BT", the aircraft operator will stop adjusting the throttle and the aircraft should breakaway from a stop.

In embodiments including autothrottle 29, once the aircraft operator has completed entering thrust related information 32 into operator input unit 22, system 20 may calculate first thrust requirement 38 and may provide commands to autothrottle 29 to adjust the throttle to produce a thrust equal to first thrust requirement 38. In this manner, the process of setting the throttle to provide first thrust requirement 38 may be automated.

Figure 6:
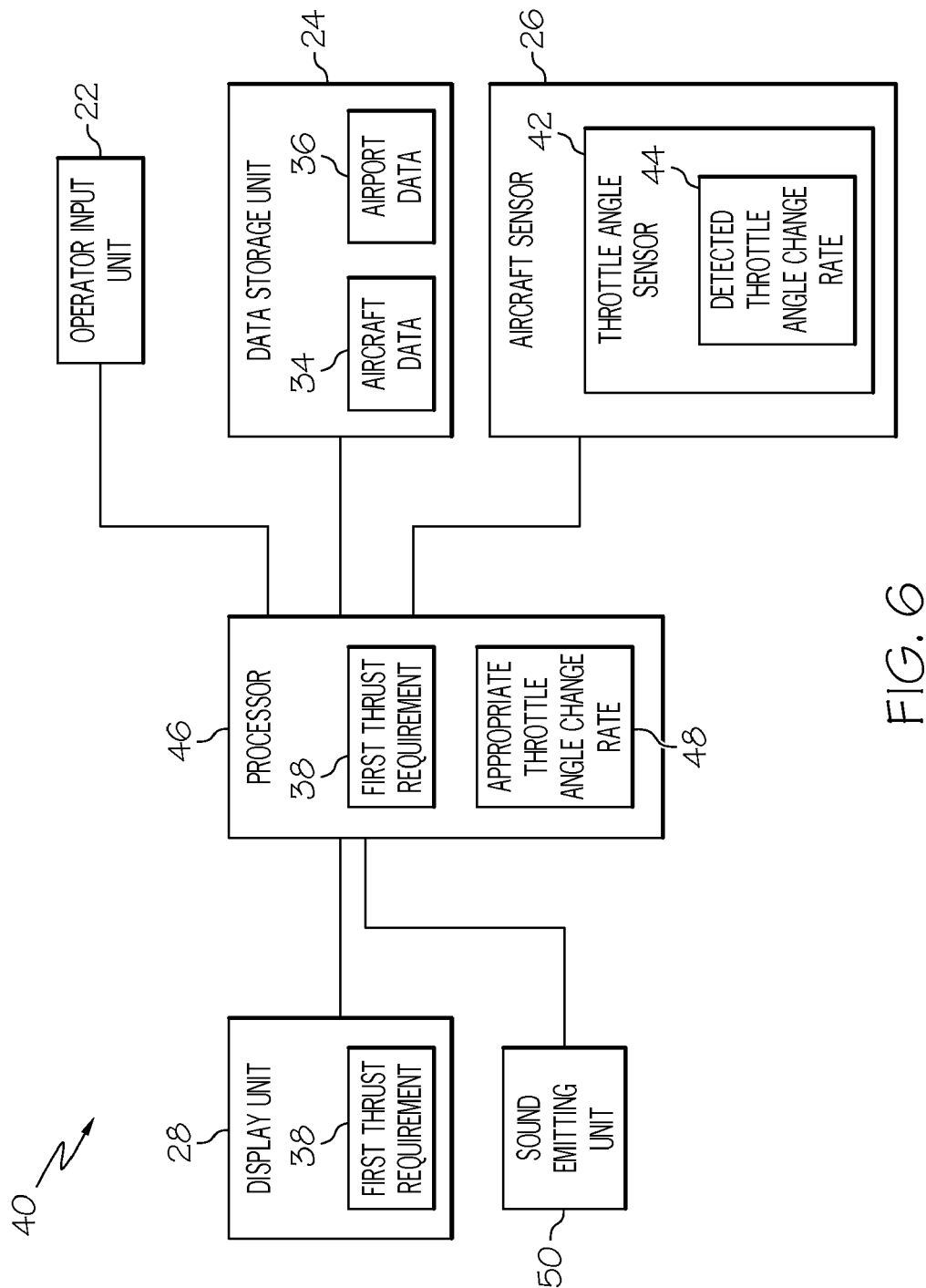
FIG. 6 is a schematic of a system for displaying control related information to an aircraft operator, according to another embodiment.

FIG. 6 is a schematic of a system 40 for displaying control related information to an aircraft operator, according to another embodiment. System 40 is similar to system 20, with some modifications. System 40 includes operator input unit 22, data storage unit 24, aircraft sensor 26, and display unit 28. In system 40, aircraft sensor 26 comprises a throttle angle sensor 42. Throttle angle sensor 42 is configured to detect the current throttle angle and to also detect a detected throttle angle change rate 44. In some embodiments, system 40 may also include additional aircraft sensors 26.

System 40 also includes a processor 46. Processor 46 is nearly identical to processor 30, but is further configured to calculate an appropriate throttle angle change rate 48. Processor 46 is loaded with programming, software applications, subroutines and/or other computer code that permits it to calculate appropriate throttle angle change rate 48 using the thrust related information available from operator input unit 22, aircraft data 34, airport data 36, and the aircraft condition information provided by aircraft sensor(s) 26.

Processor 46 is further configured to obtain detected throttle angle change rate 44 from throttle angle sensor 42 and to compare it with appropriate throttle angle change rate 48. If processor 46 determines that there is a difference between detected throttle angle change rate 44 and appropriate throttle angle change rate 48, then more fuel than necessary is being, or will be, consumed as the aircraft operator adjusts the throttle to attain first thrust requirement 38.

Processor 46 is further configured to alert the aircraft operator to this condition. In some embodiments of system 40, processor 46 may be configured to send commands to display unit 28 to display a warning. For example, display unit 28 may display text, such as "SLOW DOWN THROTTLE ADJUSTMENT" or "SPEED UP THROTTLE ADJUSTMENT" or some other similar text based message. In other embodiments, the difference between detected throttle angle change rate 44 and appropriate throttle angle change rate 48 may be displayed with graphical images rather than text.

Figure 7:
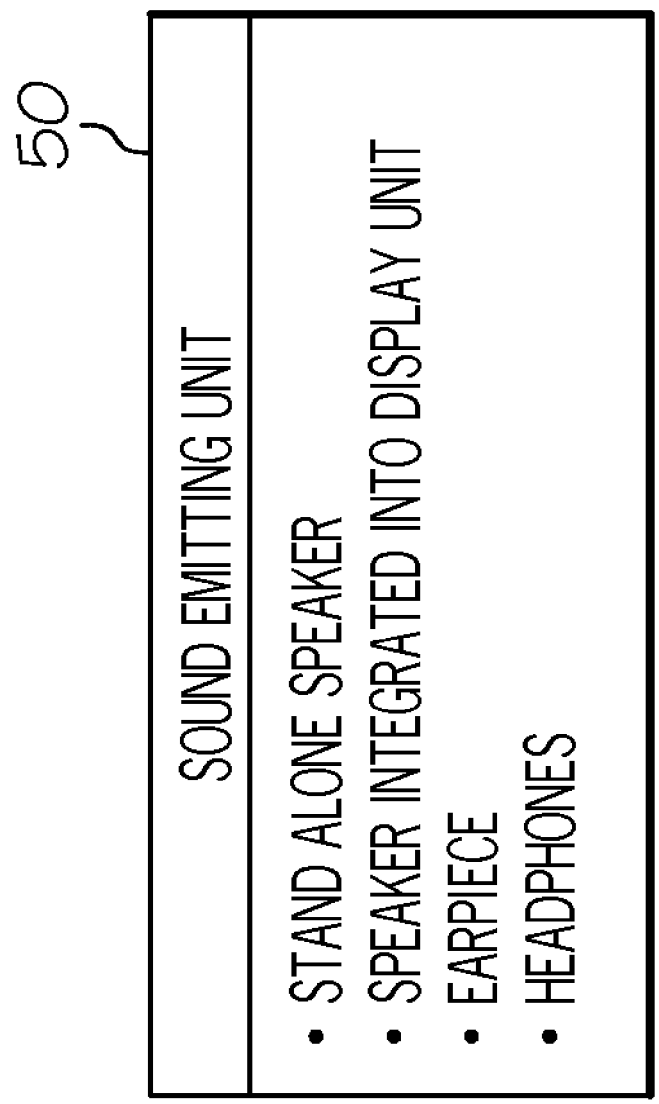
FIG. 7 is a schematic of a sound emitting unit configured for use with the system of FIG. 6.

FIG. 7 is a schematic of a sound emitting unit 50 configured for use with system 40 of FIG. 6. Sound emitting unit 50 may comprise any apparatus, machine, device, system, or subsystem configured to emit audible sound. In some embodiments, sound emitting unit 50 may comprise one or more speakers mounted in the cockpit, flight deck, or in some other location where its emissions may be audible to the aircraft operator. In some embodiments, sound emitting unit 50 may be a speaker that is integrated into display unit 28. In still other embodiments, sound emitting unit 50 may comprise an earpiece or a headset worn by the aircraft operator.

Sound emitting unit 50 is communicatively connected to processor 46 and is configured to receive commands therefrom. Processor 46 is further configured to provide commands to sound emitting unit 50 to emit a sound when processor 46 detects a difference between detected throttle angle change rate 44 and appropriate throttle angle change rate 46. In some embodiments, sound emitting unit 50 may emit spoken words indicative of the need to change the rate of throttle adjustment. In other embodiments, sound emitting unit 50 may emit a warning tone. In some embodiments, the warning tone may have either a pitch or a volume, or both, that corresponds to the magnitude of the difference between detected throttle angle change rate 44 and appropriate throttle angle change rate 48. The pitch, the volume, or both, may vary in a manner that corresponds with changes in the magnitude of the difference between detected throttle angle change rate 44 and appropriate throttle angle change rate 48. In some embodiments, when there is no difference between detected throttle angle change rate 44 and appropriate throttle angle change rate 48, sound emitting unit 50 may discontinue emitting sound. In this manner, system 40 provides the aircraft operator with real time feedback as the throttle is adjusted.

Figure 8:
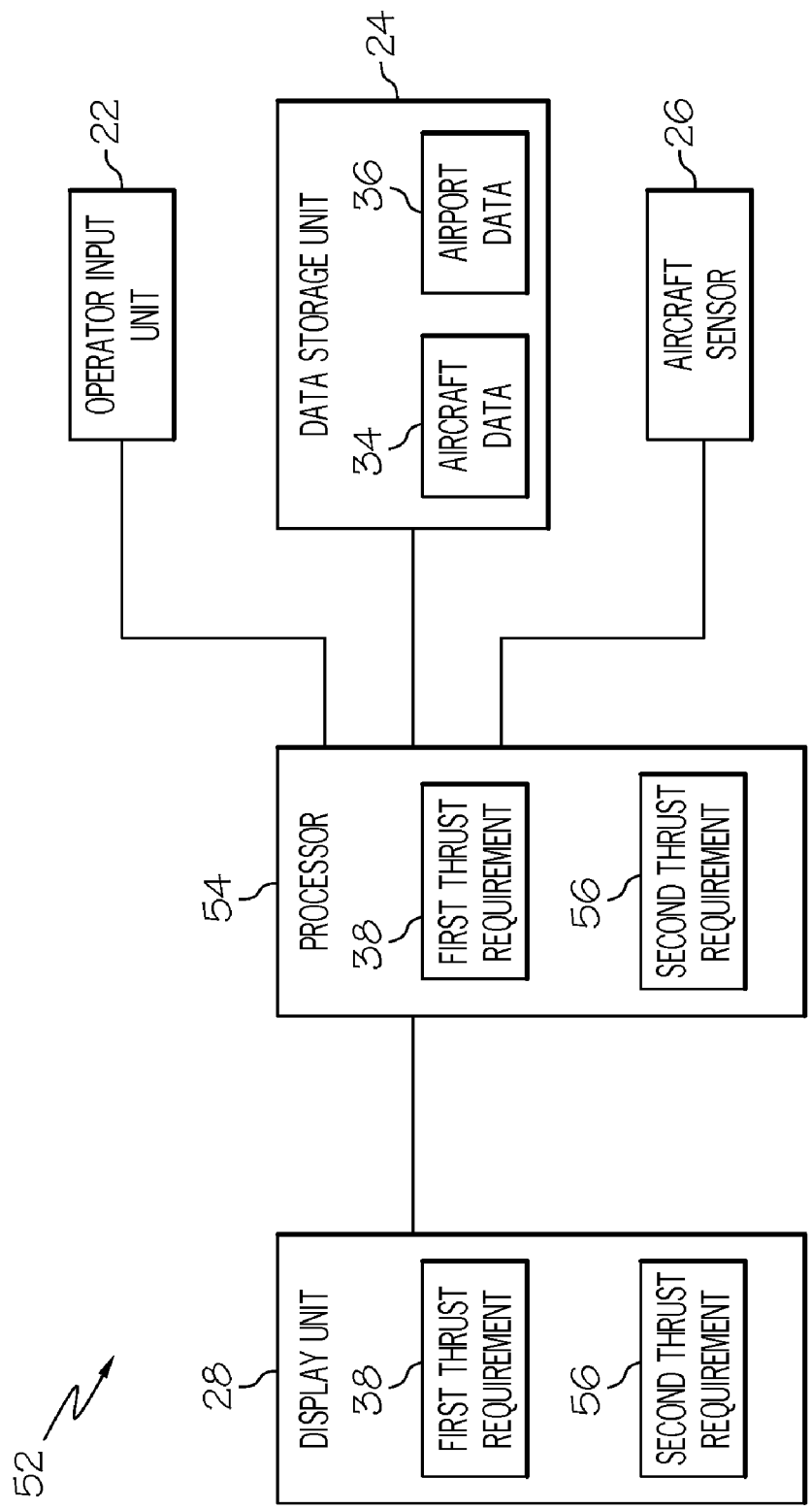
FIG. 8 is a schematic of a system for displaying control related information to an aircraft operator, according to still another embodiment.

FIG. 8 is a schematic of a system 52 for displaying control related information to an aircraft operator, according to still another embodiment. System 52 is similar to system 20, with some modifications. System 52 includes operator input unit 22, data storage unit 24, aircraft sensor 26, and display unit 28.

System 52 also includes a processor 54. Processor 54 is nearly identical to processor 30, but is further configured to calculate an additional thrust requirement. As discussed above, an aircraft operator may use operator input unit 22 to input a desired taxi speed. For example, an aircraft operator may input twenty knots as the desired taxi speed. This situation is illustrated in FIG. 5A. There, the aircraft operator has entered the number "twenty" in a window 58 provided by the flight management system. In the illustrated example, window 58 is annotated with the letters "TS" to associate window 58 with the desired taxi speed.

Operator input unit 22 provides the desired taxi speed to processor 54 together with other items of thrust related information. Processor 54 is configured to calculate a second thrust requirement 56 using the taxi speed together with any other items of thrust related information provided by operator input unit 22, aircraft data 34, airport data 36, and any aircraft condition information provided by sensor(s) 26. Second thrust requirement 56 corresponds with the thrust required to achieve and maintain the desired taxi speed, in an embodiment. In some embodiments, second thrust requirement 56 be calculated to include some amount of overpowering of the aircraft's engines in order to overcome factors which may not have been taken into consideration or to accommodate a margin of error in the factors that have been entered/detected. In another embodiment, second thrust requirement 56 may correspond substantially to the least amount of thrust required to maintain the desired taxi speed without any overpowering of the aircraft's engines.

Processor 54 is further configured to provide commands to display unit 28 to display second thrust requirement 56 to the aircraft operator. With continued reference to FIG. 5B, an example of such a display is provided. The gage depicting ITT, which is an engine parameter that correlates with thrust, includes a second tic mark labeled with the number "twenty" to illustrate the point on the gage where the aircraft's engine thrust will be sufficient to maintain the desired taxi speed of twenty knots. In other embodiments, second thrust requirement 56 may be displayed in any other suitable manner.

In embodiments of system 52 that include autothrottle 29, autothrottle 29 may be configured to set the throttle to provide enough thrust to break the aircraft away from a dead stop and then, once the aircraft has begun to move, to adjust the throttle to provide an appropriate amount of thrust necessary to allow the aircraft to attain and maintain the desired taxi speed.

Figure 9:
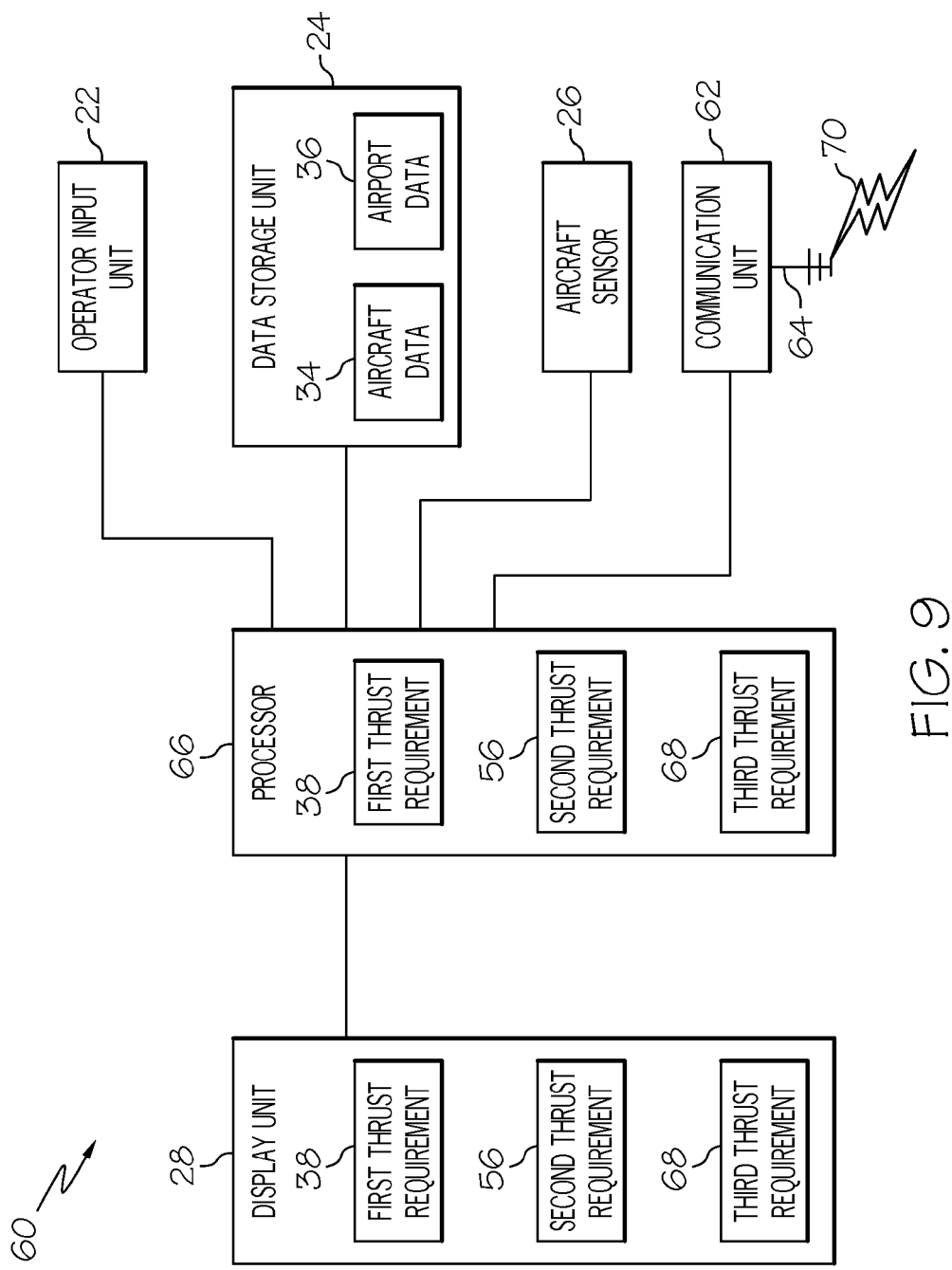
FIG. 9 is a schematic of a system for displaying control related information to an aircraft operator, according to yet another embodiment.

FIG. 9 is a schematic of a system 60 for displaying control related information to an aircraft operator, according to yet another embodiment. System 60 is similar to system 20 and system 52, with some modifications. System 60 includes operator input unit 22, data storage unit 24, aircraft sensor 26, and display unit 28.

System 60 further includes a communication unit 62. Communication unit 62 may be any type of communication device that is configured to receive wireless communications. For example, communication unit 62 may be configured to receive satellite communication transmissions, microwave transmissions or any other type of RF transmissions. In an embodiment, communication unit 62 cooperates with an antenna 64 to detect and receive such wireless communication signals. Communication unit 62 may include associated electronics to process the received signals. In an example, communication unit 62 may be configured to receive data link transmissions from ground controllers. In some embodiments, communication unit 62 may be dedicated for use exclusively with system 60 while in other embodiments communication unit 62 may be shared with other systems on board the aircraft.

System 60 also includes a processor 66. Processor 66 is nearly identical to processor 30 or processor 54, but is further configured to calculate a third thrust requirement 68.

As illustrated in FIG. 9, communication unit 62 is communicatively connected to processor 66. Communication unit 62 is further configured to receive a wireless signal 70 from a source external to the aircraft. In some examples, wireless signal 70 may be sent by a ground controller to the aircraft employing system 60 and may contain a controller defined taxi speed. Communication unit 62 is further configured to provide wireless signal 70 to processor 66, in an embodiment.

Processor 54 is configured to extract the controller defined taxi speed from wireless signal 70. Processor 54 is further configured to calculate third thrust requirement 68 using the thrust related information provided by operator input unit 22, aircraft data 34, airport data 36, any aircraft condition information provided by sensor(s) 26 and the controller defined taxi speed provided by communication unit 62. Third thrust requirement 68 corresponds with the thrust required to achieve and maintain the controller defined taxi speed, in an embodiment. Processor 66 may be further configured to provide commands to display unit 28 to display third thrust requirement 68 in generally the same manner as that discussed with reference to second thrust requirement 56. In some embodiments of system 60, processor 66 may be configured to provide commands to display unit 28 to stop displaying second thrust requirement 56 when wireless signal 70 is received or once third thrust requirement 68 has been calculated.

In some embodiments, third thrust requirement 68 be calculated to include some amount of overpowering of the aircraft's engines in order to overcome factors which may not have been taken into consideration or to accommodate a margin of error in the factors that have been entered/detected. In other embodiments, third thrust requirement 68 may correspond substantially to the least amount of thrust required to maintain the controller defined taxi speed without substantially any overpowering of the aircraft's.

In embodiments of system 60 that include autothrottle 29, autothrottle 29 may be configured to set the throttle to provide enough thrust to break the aircraft away from a dead stop and then, once the aircraft has begun to move, to adjust the throttle to provide an appropriate amount of thrust necessary to allow the aircraft to attain and maintain the controlled defined taxi speed. In this manner, autothrottle 29 may facilitate at least a partial remote control of the aircraft by ground controllers.

Figure 10:
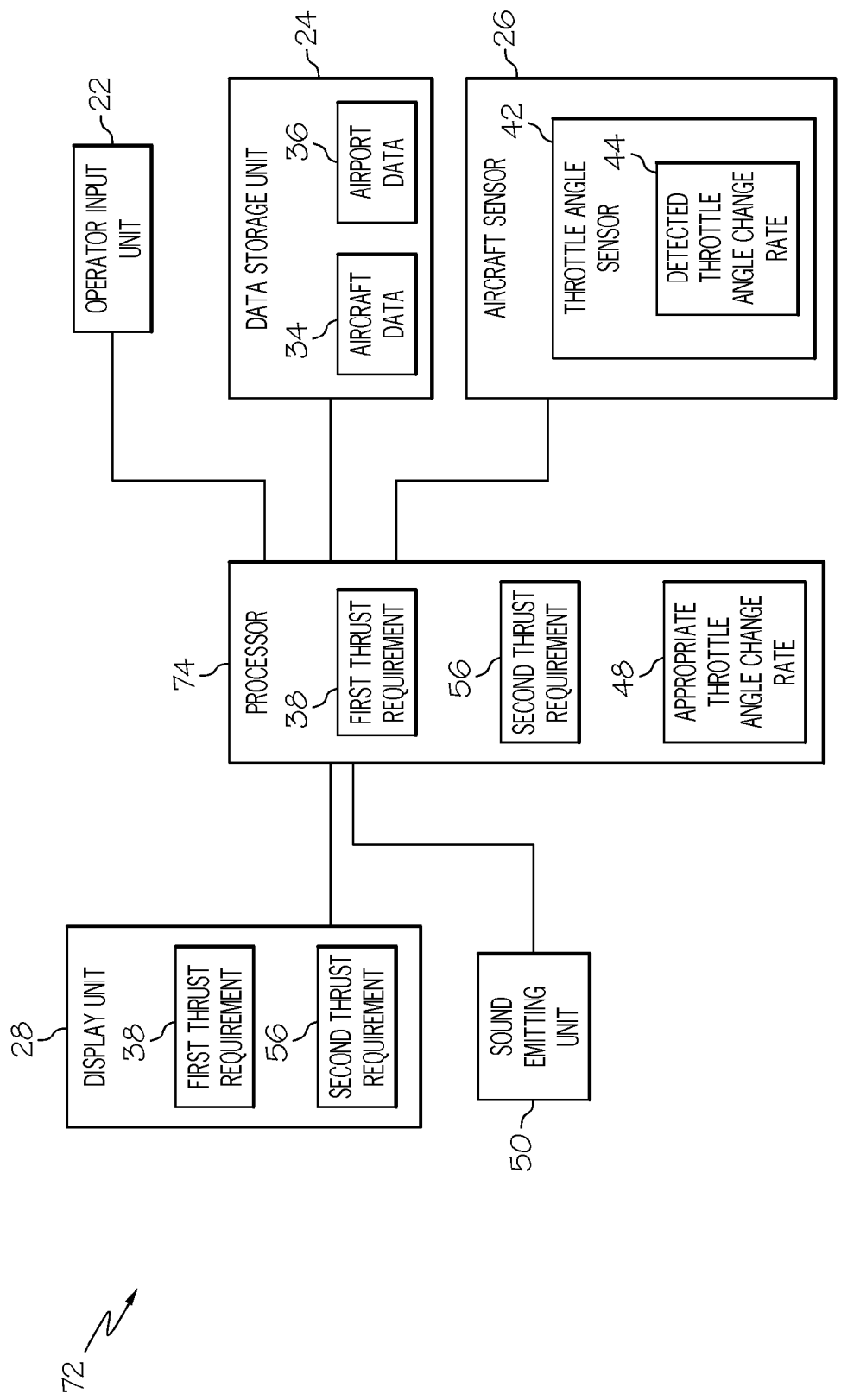
FIG. 10 is a schematic of a system for displaying control related information to an aircraft operator, according to still yet another embodiment.

FIG. 10 is a schematic of a system 72 for displaying control related information to an aircraft operator, according to still yet another embodiment. System 72 combines the functionality of system 40 (illustrated in FIG. 6) with the functionality of system 52 (illustrated in FIG. 8).

System 72 includes operator input unit 22, data storage unit 24, aircraft sensor 26, display unit 28 and sound emitting unit 50. Aircraft sensor 26 comprises throttle angle sensor 42 which is configured to detect detected throttle angle change rate 44.

System 72 further includes a processor 74 which is nearly identical to processor 30, but which is further configured to calculate second thrust requirement 56 in the same manner as discussed above with reference to FIG. 8 and to calculate appropriate throttle angle change rate 48 in the same manner as discussed above with reference to FIG. 6. Processor 74 is still further configured to provide commands to display unit 28 to display second thrust requirement 56 in the same manner as discussed above with reference to FIG. 8. Processor 74 is still further configured to alert an aircraft operator when there is a difference between detected throttle angle change rate 44 and appropriate throttle angle change rate 48 through the providing of commands to either display unit 28 or to sound emitting unit 50, in the same manner discussed above with reference to FIG. 6.

In further embodiments of the several systems described above, aircraft sensor 26 may comprise a movement detection system such as a GPS navigation system or an inertial navigation system, or some other system configured to determine movement of the aircraft. The movement information provided by the movement system may be correlated with the thrust output by the aircraft's engines as the aircraft taxis or breaks away from a stop. This information may be interpolated, extrapolated or otherwise interpreted in a manner by any or all of the systems discussed above to predict what a thrust requirement would be for a particular task. For instance, if the processor determines that a first thrust level has resulted in a first taxi speed over a known pathway surface and that a second thrust level has resulted in a second taxi speed over the known pathway surface, the system utilizing the movement detection system may be configured to use these two data points to predict a thrust requirement for any taxi speed along the pathway surface. Such a system may enhance the accuracy of any of the above described systems to calculate thrust requirements or, in some circumstances, may eliminate the need for some of the components or the need for some of the information required by the above described systems.

Figure 11:
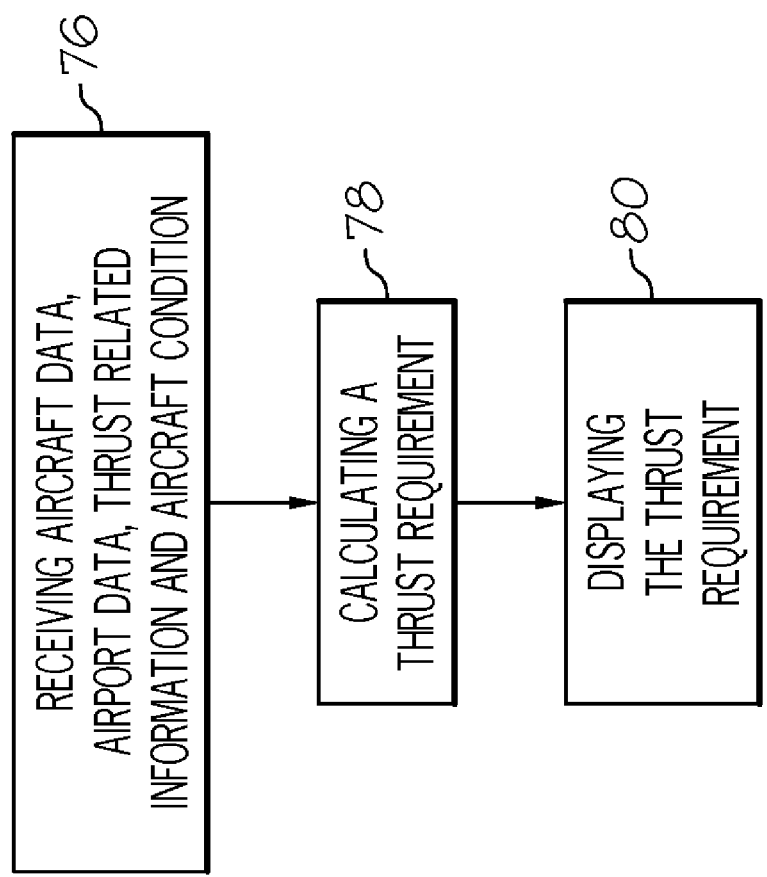
FIG. 11 is a flow diagram of a method for displaying control related information to an aircraft operator, according to an example.

FIG. 11 is a flow diagram of a method for displaying control related information to an aircraft operator, according to an example. At block 76, thrust related information is received. Thrust related information may include, but is not limited to, a desired taxi speed, a maximum taxi speed, an aircraft weight, a pathway surface condition, a pathway surface friction value, a tire condition and a weather condition.

Also at block 76, aircraft data is received. Aircraft data may include, but is not limited to, an identification of the type of aircraft under consideration, the type of engine utilized by the aircraft, the thrust curve for the engine or engines correlated with engine rpm (or with some other engine parameter), the fuel consumption rate correlated with engine rpm (or with some other engine parameter), and the fuel consumption rate per RPM change rate.

Also at block 76, airport data is received. Airport data may included an identification of the airport under consideration, the type of material used to construct each pathway surface, the grade of each pathway surface and any airport imposed maximum taxi speed.

Also at block 76, aircraft conditions are received. The aircraft conditions include, but are not limited to, the angle of the throttle, the current rpm state of the engine(s), the engine pressure ratio, the current aircraft weight, and an outside air temperature.

At block 78, the thrust related information, the aircraft data, the airport data and the aircraft conditions are utilized to calculate a thrust requirement needed to either break the aircraft away from a dead stop or the thrust needed to achieve and/or maintain a desired taxi speed. In some examples, both will be calculated.

At block 80, the thrust requirement calculated at block 78 will be displayed to an aircraft operator. The thrust requirement may be displayed in any suitable manner and may include information correlating to any commonly used engine output metric, such as pounds of thrust, rpms, pressure ratios, and the like. The pilot may then adjust the throttle to achieve the calculated thrust requirement.

The above system provides numerous advantages over existing practice by taking much of the guess work out of throttle control for the taxi stage of an aircraft's flight. By providing aircraft operators with thrust requirements, the overpowering of an aircraft's engines can be avoided. This, in turn, can reduce the engine's fuel consumption, emissions, engine wear and noise pollution. Additionally, by providing the aircraft operator with feedback concerning the rate at which the throttle should be adjusted, the above systems and methods further enhance the advantages over current practice.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for displaying control related information to an aircraft operator, the system comprising:
   a display unit;
   a data storage unit configured to store aircraft data and airport data;
   an operator input unit configured to receive thrust related information from the aircraft operator;
   an aircraft sensor configured to detect an aircraft condition; and
   a processor communicatively connected to the display unit, the data storage unit, the operator input unit and the aircraft sensor,
   wherein the processor is configured to obtain the aircraft data and the airport data from the data storage unit, to obtain the thrust related information from the operator input unit, and to obtain the aircraft condition from the aircraft sensor, to calculate a first thrust requirement based on the aircraft data, the airport data, the thrust related information, and the aircraft condition, and to provide commands to the display unit to display the first thrust requirement.

2. The system of claim 1, wherein the first thrust requirement corresponds to a breakaway thrust.

3. The system of claim 2, wherein the first thrust requirement comprises a minimum thrust required to achieve breakaway.

4. The system of claim 1, wherein the aircraft data includes at least one of a type of engine associated with an aircraft, a thrust curve for the type of engine correlated to rpms, a rate of fuel consumption for an engine correlated to engine rpms, and a rate of fuel consumption for the engine correlated to a rate of change of the engine rpms.

5. The system of claim 1, wherein the airport data includes at least one of an identification of a surface material used to fabricate a pathway surface at an airport and an identification of a grade of the pathway surface at the airport.

6. The system of claim 1, wherein the thrust related information comprises at least one of a desired taxi speed, a weight of an aircraft, a condition of a pathway surface, a friction value for the pathway surface, a condition of a tire of the aircraft, and a weather condition in a vicinity of the aircraft.

7. The system of claim 1, wherein the aircraft sensor comprises at least one of a throttle angle sensor, an engine rpm sensor, an engine pressure ratio sensor and an aircraft weight sensor.

8. The system of claim 1, wherein the aircraft sensor comprises a throttle angle sensor configured to detect a rate of change of throttle angle (the detected throttle angle change rate) and wherein the processor is further configured to obtain the detected throttle angle change rate from the throttle angle sensor, to calculate an appropriate throttle angle change rate based on the aircraft data, the airport data, the thrust related information, and the aircraft condition, to compare the detected throttle angle change rate with the appropriate throttle angle change rate, and to alert the aircraft operator when the appropriate throttle angle change rate differs from the detected throttle angle change rate.

9. The system of claim 8, further comprising a sound emitting unit communicatively connected to the processor, wherein the processor is configured to provide commands to the sound emitting unit to emit an audible tone when the appropriate throttle angle change rate differs from the detected throttle angle change rate.

10. The system of claim 9, wherein a pitch of the audible tone corresponds to a difference between the appropriate throttle angle change rate and the detected throttle angle change rate.

11. A system for displaying control related information to an aircraft operator, the system comprising:
   a display unit;
   a data storage unit configured to store aircraft data and airport data;

an operator input unit configured to receive thrust related information from the aircraft operator including a desired taxi speed;

an aircraft sensor configured to detect an aircraft condition; and a processor communicatively connected to the display unit, the data storage unit, the operator input unit and the aircraft sensor, wherein the processor is configured to obtain the aircraft data and the airport data from the data storage unit, to obtain the thrust related information from the operator input unit, and to obtain the aircraft condition from the aircraft sensor, to calculate a first thrust requirement based on the aircraft data, the airport data, the thrust related information, and the aircraft condition, to provide commands to the display unit to display the first thrust requirement, to calculate a second thrust requirement based on the aircraft data, the airport data, the thrust related information, and the aircraft condition, and to provide commands to the display unit to display the second thrust requirement.

12. The system of claim 11, wherein the first thrust requirement corresponds to a breakaway thrust and wherein the second thrust requirement corresponds to a thrust needed to maintain the desired taxi speed.

13. The system of claim 12, wherein the first thrust requirement corresponds to a minimum thrust required to achieve breakaway and wherein the second thrust requirement corresponds to a minimum thrust required needed to maintain the desired taxi speed.

14. The system of claim 11, further comprising:

a communication unit communicatively connected to the processor, the communication unit being configured to receive a wireless signal from a remotely located source, the wireless signal containing information relating to a controller defined taxi speed, wherein the processor is further configured to obtain the wireless signal from the communication unit and to calculate a third thrust requirement corresponding to the controller defined taxi speed based on the aircraft data, the airport data, the thrust related information, the aircraft condition, and the wireless signal, and to provide commands to the display unit to display the third thrust requirement.

15. The system of claim 14, wherein the third throttle setting corresponds to a minimum thrust requirement needed to maintain the controller defined taxi speed.

16. The system of claim 14, wherein the processor is further configured to refrain from providing commands to the display unit to display the second thrust requirement when the processor obtains the wireless signal from the communication unit.

17. The system of claim 11, wherein the aircraft sensor comprises a throttle angle sensor configured to detect a rate of change of throttle angle (the detected throttle angle change rate), and wherein the processor is further configured to obtain the detected throttle angle change rate from the throttle angle sensor, to calculate an appropriate throttle angle change rate based on the aircraft data, the airport data, the thrust related information, and the aircraft condition, to compare the detected throttle angle change rate with the appropriate throttle angle change rate, and to alert the aircraft operator when the appropriate throttle angle change rate differs from the detected throttle angle change rate.

18. The system of claim 17, wherein the processor is configured to provide commands to the display unit to display an indication when the appropriate throttle angle change rate differs from the detected throttle angle change rate.

19. The system of claim 17, further comprising a sound emitting unit communicatively connected to the processor, wherein the processor is configured to provide commands to the sound emitting unit to emit an audible tone when the appropriate throttle angle change rate differs from the detected throttle angle change rate.

20. A method for displaying control related information to an aircraft operator, the method comprising the steps of:

receiving aircraft data, airport data, thrust related information and an aircraft condition;

calculating a thrust requirement based on the aircraft data, the airport data, the thrust related information and the aircraft condition; and displaying the thrust requirement.

* * * * *